July 1, 1969     R. SZPUR     3,453,556

COHERENT RADIATION DEVICE IRRADIATED BY MEANS OF RADAR WAVES

Filed Oct. 6, 1964

INVENTOR
ROMAN SZPUR

BY

ATTORNEY
AGENT

United States Patent Office 3,453,556
Patented July 1, 1969

3,453,556
COHERENT RADIATION DEVICE IRRADIATED BY MEANS OF RADAR WAVES
Roman Szpur, 4366 Silman Place, Kettering, Ohio 45429
Filed Oct. 6, 1964, Ser. No. 402,041
Int. Cl. H01s 3/09, 3/22
U.S. Cl. 331—94.5    3 Claims

ABSTRACT OF THE DISCLOSURE

Electromagnetic wave energy from a radar transmitter produces an ionization plasma in a rare earth gas surrounding a laser rod, the plasma optically pumps the laser rod to establish the laser emission.

---

Figures 1, 2:
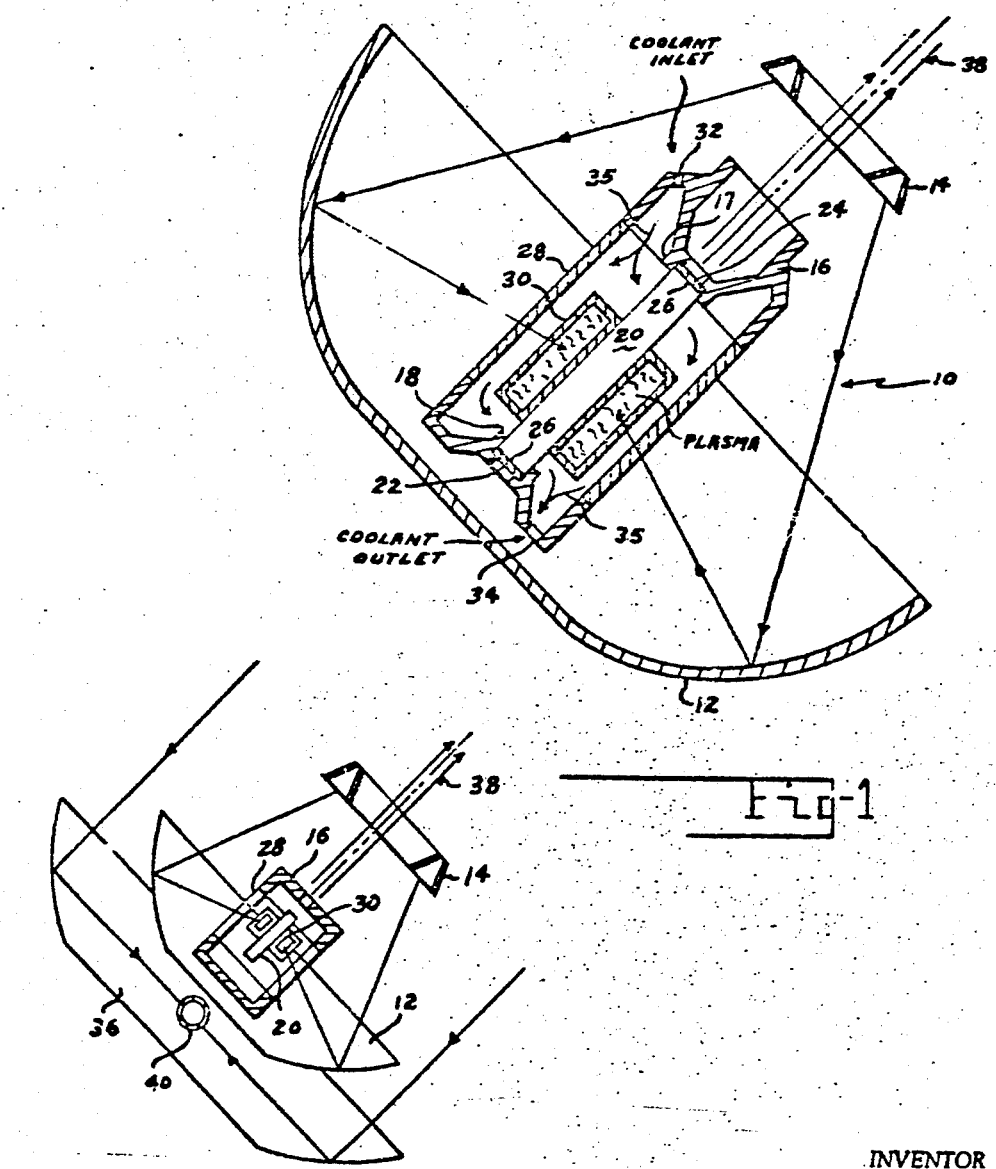

The invention described herein may be manufactured and used by or for the United States Government for governmental purposes without the payment to me of any royalty thereon.

This case relates to coherent radiation devices and, particularly, to a laser weapon in which radar waves abstracted from co-working radar apparatus are converted to "pumping" radiation in the light frequency range.

Laser devices known in the art generally employ as the chief element a rod or bar of active material vigorously productive, when excited by copious amounts of visible light, of monochromatic coherent radiation extensive in penetrating and destructive power. Major problems in the production of coherent radiation for use in military applications include the nonexistence of a light-weight, moderately priced, and relatively simple technique for adequately pumping the laser material forming the heart of such weapons. Bringing the laser material to a state of excitation beneficial to coherent emission has proceeded along miscellaneous lines, one successful method being to discharge a capacitor bank through one or more flashlamps disposed to bathe the laser crystal in intense light. This method, however, has proven somewhat costly due to the necessary acquisition and storage of the capacitive elements.

Accordingly, one object of this invention is to provide a laser weapon which relies on an external and separately operating installation to supply the energy essential for optical laser pumping.

Another object of the invention is the provision of a laser weapon of unusually high efficiency, compactness, and reliability.

Yet another object of the invention is to provide a laser weapon versatile in the respect that radar waves issuing from any satisfactorily powerful radar system can contribute the necessary primary excitation.

To carry the foregoing objects into effect, the coherent radiation weapon embodying the invention capitalizes on the presence of radar waves from co-working apparatus and diverts these waves momentarily from the purpose they serve for exciting a plasma-generating medium whereby the energy of the laser material is raised to the coherent radiation-initiating level. Periodic abstractions on the order of several microseconds each are enough to stimulate the plasma to emit optical energy at the correct emission spectrum. Such parasitic accretion is easily achieved with no debility of the host system on which it depends.

A complete understanding of the invention and an introduction to other objects not specifically mentioned may be had from the following description of the invention when read in conjunction with the accompanying drawings wherein like reference characters refer to like parts in the several views, and wherein:

FIG. 1 is a preferred embodiment of the laser weapon embodying the invention; and
FIG. 2 is a modification of the device shown in FIG. 1.

Referring now to FIG. 1, the reference numeral 10 generally indicates a laser weapon according to the invention which comprises a typical reflector 12 and a circular wave guide 14 of any convenient design disposed in front of the reflecting surface of reflector 12. Wave guide 14 is adapted for connection to a co-working radar system (not shown) by which radar waves emitted by the radar system in the course of discharging its particular function are abstracted by wave guide 14. Radiation energy emerging from wave guide 14 follows the path of the arrows shown thus being reflected from reflector 12 and then being applied to a housing 16 generally tubular in cross section and lying between reflector 12 and wave guide 14. The location of housing 16 within reflector 12 is chosen in accordance with the desired pattern of radiation bombardment of housing 16.

Inwardly extending end walls 17 and 18 in housing 16 fixedly restrain a rod or bar 20 of active laser material in concentric relation to the axis of reflector 12. For solid state devices, ruby is appropriate to gain the advantages of this invention.

End faces 22 and 24 of rod 20 are suitably covered with a reflective coating 26 which enhances internal reflection. Silver or other elements of high reflectivity are acceptable. The coating 26 on end face 22 is 100 percent reflective whereas end face 24 is coated to produce roughly 98 percent reflectivity, leaving a transmission figure of, say, 2 percent. Coherent radiation emerges through end face 24 where the borestream passes unhindered through a central aperture in wave guide 14.

The greater part of housing 16 is formed with a cylindrical transparent glass envelope 28 for admitting the electromagnetic radiation incident on reflector 12. Rod 20 is sleeved partially over its length by a clear capsule 30 similarly transparent to the radiation entering envelope 28. The capsule 30 contains an ionizable rare earth gas such as xenon which, when ionized, produces a plasma column dispersing light in all directions. Light emitted by the plasma column, as known in the art, will optically pump rod 20 from virtually all directions and establish the coherently emitting area at end face 24.

In the illustrated construction a gas, such as nitrogen, ideally dry and say at room temperature, is taken in at a coolant inlet 32 adjacent one end of housing 16 and is circulated under pressure through the interior of housing 16 to a coolant outlet 34 at the other end. The irrigation of the rod 20 and capsule 30 dissipates the heat developed during excitation of the pumping energy source and is explained by the flow lines 35 shown. Moreover, the coolant establishes a fairly constant operating temperature thereby giving better and more lasting use of the laser material. The rapid cooling of the housing 16 after each injection of pumping energy is also conducive to consistent production of optical light which has a wavelength matching the absorption band of rod 20. Further advantages of the explained heat reduction include greater pumping efficiency and longer preservation of the active materials themselves.

Any suitable means, not shown, may be used for mounting the various elements hereinabove described in the desired positions with respect to each other. For example, reflector 12 may be mounted on the hull, airframe, or bulkhead of the vehicle from which power admitted through wave guide 14 will be drawn.

Referring now to FIG. 2, a secondary reflector 36 is disposed behind reflector 12 for directing coherent radiation energy returning from objects affected by the wave 38 to a collector 40 of suitable design. The breadth of reflector 12 is selected such that reflector 36 is protected from high power radiation from wave guide 14. Collector 40 thus may be connected to external means which may take the form of tracking, ranging, interrogating, or fire-control apparatus not shown. Thus, with very little modification, the principles underlying the preferred embodiment of FIG. 1 can conveniently be extended by the addition of reflector 36 and collector 40 to form a weapon system easily integrated into still other apparatus. The arrangement of FIG. 1 can, for example, either be stationary or adapted for turret control. In the interest of simplicity, the cooling feature as would be applied to the FIG. 2 embodiment has been omitted. Also, for the details of end mounting rod 20 reference may be had to FIG. 1.

In operation, radar waves leaving wave guide 14 are reflected from reflector 12 and enter housing 16 through envelope 28 where they richly excite the plasma-producing gas contained in capsule 30. The plasma during its generation is selected to have an emitted energy band in response to radar wave bombardment which will excite the crystal material in rod 20 at a wavelength most favorable for maximum monochromatic coherent radiation. Coherent light generated in rod 20 is transmitted back toward wave guide 14 and moves unhampered therethrough. Simultaneously, the internal temperature of housing 16 is maintained at acceptable levels by means of the circulating coolant.

It will be understood that rather than using merely a single laser element as shown in the illustrated embodiments, equally useful is an arrangement which includes an array of several laser elements (not shown) distributed to produce simultaneous emission, and being arranged such that the plasma-generating substance is placed in enveloping relation between, within, and around the laser elements forming the array.

It will be apparent to those skilled in the art that changes and other modifications may be proposed without departing from the spirit of the invention and the scope of the appended claims.

I claim:
1. In an installation in which electromagnetic radiation is fed from a radar transmitteer to an external load, a laser weapon comprising: a body capable of the emission of coherent radiation and having a length several times larger than its cross-sectional dimension, means for rendering one end of said body totally reflective and the opposite end partially transparent to afford egress of said coherent radiation from said opposite end, an encapsulated ionizable plasma-producing gas confined about said body over part of its length for optically pumping said body to obtain coherent emission radiation, a transparent envelope covering said gas and said rod with a space therebetween for fluid circulation, means having inlet and exhaust connections with said envelope for circulating a heat-absorption agent through said envelope, a reflector disposed behind said body facing said totally reflective end and disposed in energy-focusing relation with said ionizable means, and waveguide means aligned facing said reflector and said partially transparent end of said body but removed from the borestream of said coherent radiation for abstracting from said transmitter a portion of its transmission energy thereby permitting irradiation of said ionizable means following impingement of said reflector.

2. Apparatus according to claim 1 further comprising a secondary reflector disposed behind said first-named reflector and being of predetermined size to avoid being shadowed by said first-named reflector, said secondary reflector being disposed to collect echo signals from objects affected by said coherent radiation.

3. A laser system comprising:
(a) ruby laser rod means capable of being optically pumped and having a reflecting end and a laser radiation emitting end, for providing a borestream of laser emission;
(b) capsule means positioned in sleeve relationship with the said laser rod containing xenon gas;
(c) circular radar waveguide means concentric with the said borestream and having a central aperture for the passage of said borestream, for directing radar electromagnetic wave radiation energy in the general direction of the said laser rod; and
(d) reflecting means spaced apart from the said reflecting end of the laser rod, cooperating with the said waveguide means for reflecting the said radar electromagnetic wave radiation from the said waveguide onto the xenon gas for ionizing the xenon gas to provide a gas plasma for optically pumping the said ruby laser rod.

References Cited

UNITED STATES PATENTS

| 3,209,281 | 9/1965 | Colgate et al. | 331—94.5 |
| 3,353,115 | 11/1967 | Maiman | 331—94.5 |

OTHER REFERENCES

Crompton et al., Plasma Pumped Laser, Electronics, Mar. 23, 1964, vol. 37, No. 12.

RONALD L. WIBERT, *Primary Examiner.*

T. MAJOR, *Assistant Examiner.*